Dec. 3, 1940.    D. J. BILLER    2,223,841
SHIELDED LENS
Filed June 19, 1939
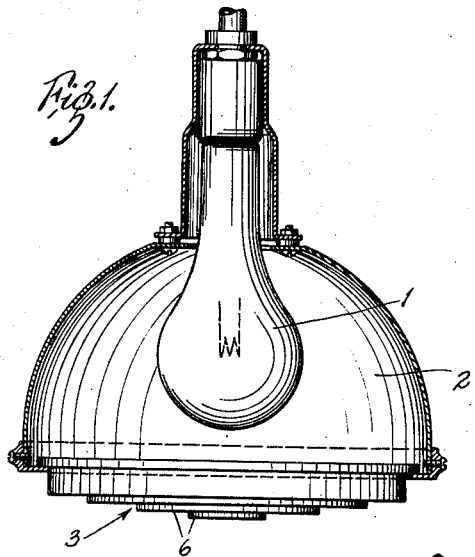
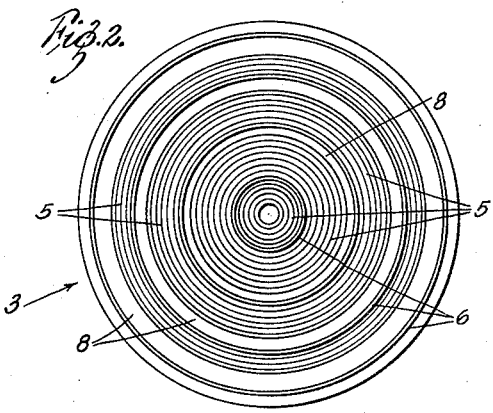
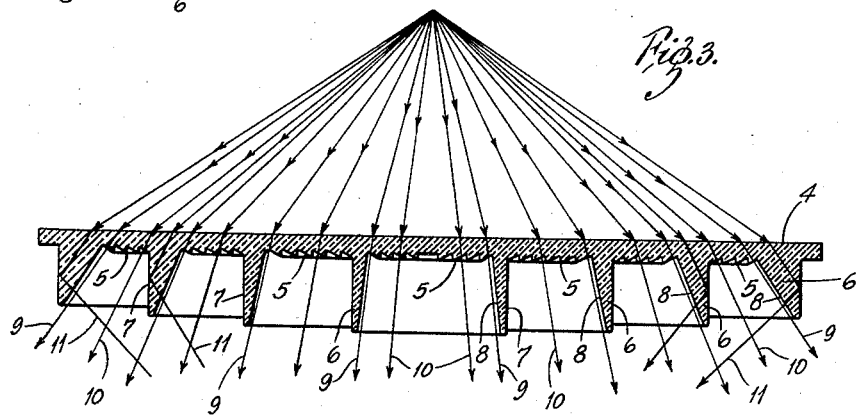
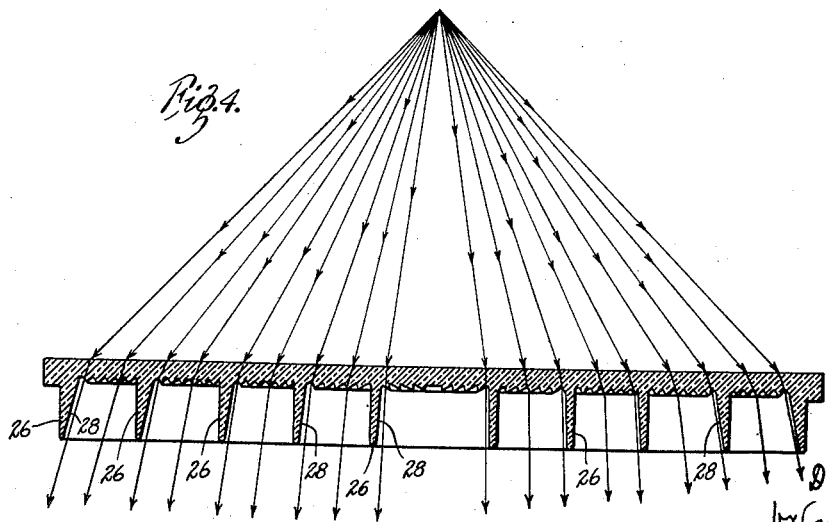
INVENTOR
D. J. Biller,
by Carlton Hill
HIS ATTORNEYS Patented Dec. 3, 1940

2,223,841

UNITED STATES PATENT OFFICE 2,223,841

SHIELDED LENS

David J. Biller, St. Louis, Mo., assignor to Day-Brite Lighting, Inc., St. Louis, Mo., a corporation of Missouri Application June 19, 1939, Serial No. 279,833

2 Claims. (Cl. 240—78)

My invention relates to lenses of the multiple prism type, particularly lenses for interior illumination and has for its principal object to shield the light rays emanating from such lenses so as to minimize the amount of light passing into the "glare zone," that is the angle between the horizontal and 30° below the horizontal.

The invention consists principally in a lens of the multiple prism type provided with a plurality of projecting ribs on its lower surface, said ribs extending completely around the lens and parallel with the outer periphery thereof, the outer faces of said ribs being substantially vertical and the inner faces being substantially in the line of light rays passing through the lens. The invention further consists in the shielded lens and in the parts and combinations and arrangements of parts hereinafter described and claimed.

In the accompanying drawing,

Fig. 1 is a vertical sectional view of a lighting unit having a shielded lens embodying my invention, the lens being shown in elevation, Fig. 2 is a bottom plan view of the lens, Fig. 3 is a vertical sectional view of the lens, with arrows diagrammatically indicating the path of light rays; and Fig. 4 is a view similar to Fig. 3, of a modified lens.

In Fig. 1 is shown a light bulb 1, with a suitable shade or reflector 2 and a lens embodying my invention, indicated generally by 3. The upper surface 4 of said lens is plane and the lower surface is provided with a multiplicity of prisms 5 for directing the light rays angularly downwardly into the room. Also depending from the lower surface of the lens are a plurality of deep, comparatively narrow ribs 6. The outer face 7 of each rib is substantially vertical and the inner face 8 is disposed at an angle that extends along the line of light rays 9 emanating from the lens adjacent to said rib. Thus light rays 9 alongside the inner faces of the ribs, pass freely downwardly into the room without interruption as do light rays 10 passing through the lens between ribs. Light rays 11 that pass through the lens and into the ribs 6 themselves are reflected from the inner surfaces of the rib walls until they finally pass through the ribs downwardly into the room, below the glare zone.

The "glare zone" for light rays emanating from a ceiling light is a zone between the horizontal plane at the light source and 30° therebelow. It will be seen from the light ray diagrams of Figs. 3 and 4 that substantially all of the light passing through the lens is directed downwardly into the room below said glare zone, that is, below a conical surface whose elements are at an angle of 30° below the horizontal. In other words, the included angle of the light rays is not to exceed 120° or 60° on either side of the vertical. The above lens, by minimizing the amount of light passing through the "glare zone" concentrates the light in the working zone where it is needed, and minimizes eye strain. The ribs have a low outer surface brightness by reason of the light being projected inwardly therefrom and a low inside surface brightness as well.

The lens and rib arrangement shown in Fig. 3 provides a comparatively wide light distribution, fairly closely approaching the 120° angle. As indicated in Fig. 4, the light distribution may be varied by changing the prisms and the ribs, Fig. 4 illustrating a narrow or concentrated distribution of light. In Fig. 4, the ribs 26 are narrower in proportion to their depth and their inner faces 28 make less of an angle with the vertical. Many other arrangements of prisms and ribs are possible.

The lens proper may be square or of any other desired shape or plane instead of the circular shape shown in the drawing, the ribs in each case extending completely around the lens and parallel with the outer periphery of the lens.

Obviously numerous changes may be made without departing from the invention and I do not wish to be limited to the precise construction shown.

What I claim is:

1. A shielded lens for an electric light bulb, said lens having a plane upper surface and a lower surface provided with prisms, said lower surface also having projecting annular ribs whose inner faces are disposed at various angles, the angle of each face coinciding with the angle of light rays passing through the lens adjacent to said inner face.

2. A shielded lens for an electric light bulb, said lens having a plane upper surface and a lower surface provided with prisms, said lower surface also having integral projecting annular ribs whose outer faces are substantially vertical and parallel with the periphery of the lens and whose inner faces are disposed at various angles, the angle of each face coinciding with the angle of light rays passing through the lens adjacent to said inner face.

DAVID J. BILLER.